United States Patent Office 3,558,438
Patented Jan. 26, 1971

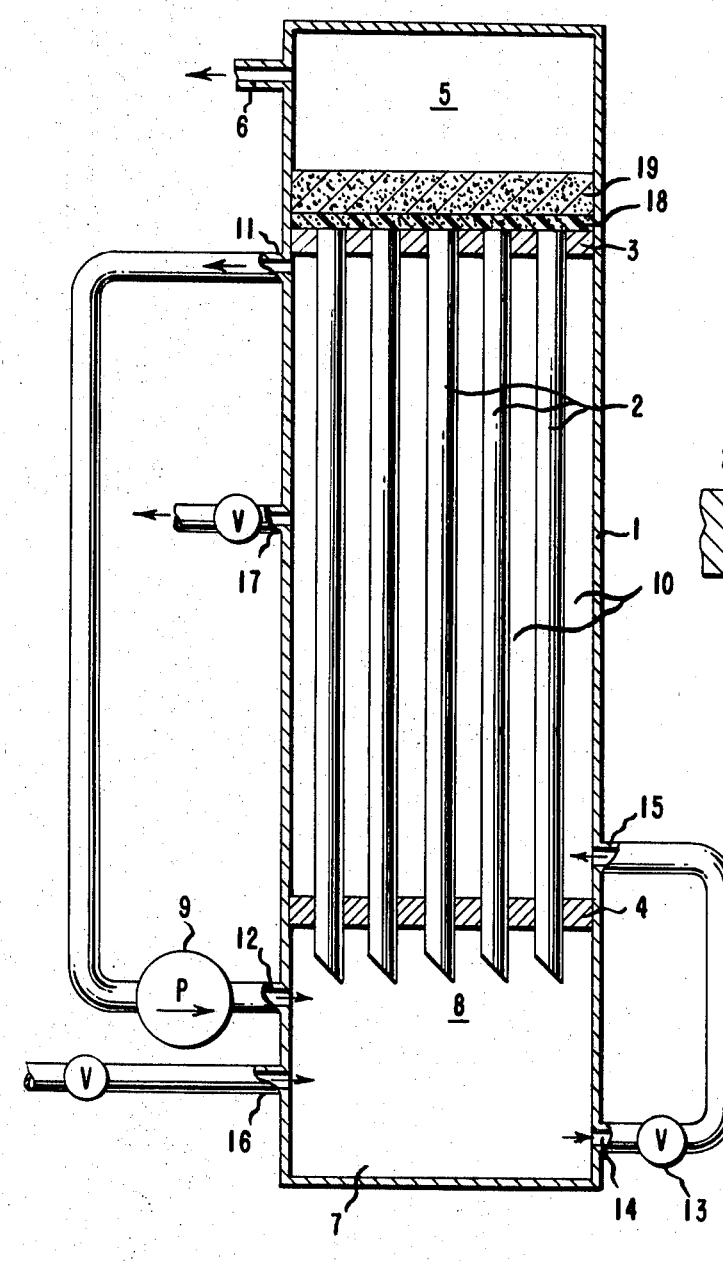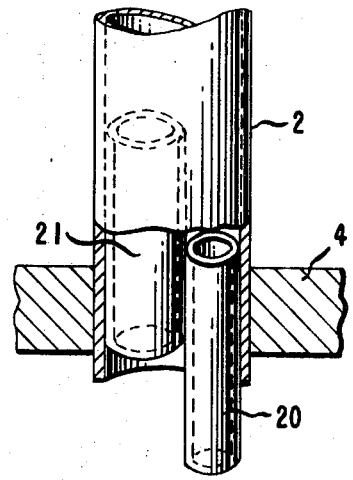

3,558,438
DISTILLATION PROCESS AND APPARATUS
Leland C. Schoenbeck, Wilmington, Del., assignor to E. I. du Pont de Nemours and Company, Wilmington, Del., a corporation of Delaware
Filed Oct. 30, 1968, Ser. No. 771,827
Int. Cl. B01d 3/00
U.S. Cl. 203—26                                                            10 Claims

ABSTRACT OF THE DISCLOSURE

A process for separating a lower boiling fraction as a vapor from a mixture of compounds by a novel open tube wetted wall distillation process in a multitube still, provided with vapor recompression of vaporized reflux condensate to combine the heating and cooling operation, and an apparatus utilized in said distillation.

BACKGROUND OF THE INVENTION

(1) Field of the invention

This invention relates to the separation of a lower boiling point fraction as a vapor from a mixture of compounds and more particularly to a process for separating a lower boiling point fraction from a mixture of compounds having close boiling points, and an apparatus utilized in said process.

(2) Description of the prior art

Wetted wall distillation is a process known in the art for fractionating mixtures of liquids in a cylindrical open-end tube. Vapors of the mixture are introduced into the bottom of an open-end tube and are contacted with a reflux liquid flowing countercurrently within the tube. The vapors of the higher boiling point compounds condense upon contact with the liquid reflux and flow downward with it while the vapors of the lower boiling point compounds pass to the top of the tube and can be withdrawn therefrom. A continuation of the process results in a further separation of the lower and higher boiling point compounds.

One such existing process is that disclosed by Fenche, in U.S. Pat. 2,037,316, and comprises introducing the vapors of a mixture of compounds, in a unit stream, into a fractionating tower made up of a plurality of relatively small-diameter packed fractionating colums, where the vapors contact a countercurrent flow of refluxing liquid and whereby the vapors are "scrubbed" of their heavier components.

In another process described by Etienne in U.S. Pat. 2,949,745, a gaseous mixture passes on the outside of the heat exchange surface of a heat exchange apparatus and is partially liquefied while a liquid mixture flowing by gravity down the inside of the heat exchange surface is partially vaporized, said vapors being rectified as they pass in countercurrent contact with the liquid. The rectified vapors and liquid are collected separately and the vapors are returned in heat exchange with the gaseous mixture flowing on the outside of the heat exchange surface.

SUMMARY OF THE INVENTION

The present invention comprises a process for separating a lower boiling point fraction as a vapor from a mixture of compounds having different boiling points which comprises simultaneously passing vapors of the mixture of compounds into the lower ends of the interiors of a bundle of vertically oriented generally parallel open end essentially equal diameter tubes, said tubes being wettable by condensate of the vapors. The vapors of the lower boiling point compound which pass out of the upper ends of said tubes are withdrawn, and the vapors of the higher boiling point compounds are condensed as a falling film on the inner walls of said tubes. Said condensate is collected from the lower ends of said tubes and transferred to contact with the exterior walls of said tubes where, the pressure exterior to said tubes being less than the pressure within said tubes, the condensate is partially or completely vaporized by the heat of reflux within the tubes. The vapors of said liquid condensate thus formed are pumped through a vapor pump and into the lower ends of the interiors of the tubes for further fractionation.

The apparatus aspect of the invention is described as follows:

An apparatus for separating a lower boiling ponit fraction as a vapor from a mixture of compounds having different boiling points which comprise a cylindrical shell having its longitudinal axis vertically oriented with an upper closure at the top and a lower closure at the bottom; a bundle of generally parallel open end essentially equal diameter tubes mounted within the shell having their axis generally parallel to the longitudinal axis of the shell; a seal at the upper end of the tubes being horizontally situated across the interior of the shell and encircling each tube forming a top head space below the upper closure of the shell which communicates with the interior of the tubes, and serving as an upper end wall of a shell space; a vapor outlet in the top head space; a seal at the lower end of the tubes being horizontally situated across the interior of the shell and encircling each tube forming a bottom head space the lower portion of which is a liquid holder space and the top portion of which communicates with the interior of the tubes, and serving as a lower end wall of a shell space; an inlet in the bottom head space; a vapor pumping means for transporting vapors from the upper end of the shell space to the upper portion of the bottom head space forming a vapor circulating system; a liquid recirculating means for transporting liquid from the lower portion of the bottom head space to the lower end of the shell space; and an outlet communicating with the shell space for removing liquid.

DESCRIPTION OF THE DRAWING

FIG. 1 shows a side elevation of an embodiment of the apparatus of the invention.

FIG. 2 shows an open drip tube and an open vapor tube mounted inside an outer tube which represents an alternative to the diagonally cut bottom end of each tube of FIG. 1.

DESCRIPTION OF THE INVENTION

While wetted wall distillation is an art known process, the present invention comprises a novel wetted wall distillation in a multitube still provided with vapor recompression of vaporized reflux condensate to combine the heating and cooling operation in the separation of compounds having different boiling points.

This invention involves combining the reboiling and cooling steps found in many existing distillation processes into a single means in a novel manner wherein some reboiled mixture is cooled by another part of the mixture in a liquid phase to produce a simplified process.

Vapors of a mixture of compounds pass into the lower ends of the interiors of a bundle of vertically oriented generally parallel open end essentially equal diameter tubes, said tubes being wettable by condensate of the vapors, withdrawing vapors of the lower boiling point compound which pass out of the upper ends of said tubes and condensing vapors of the higher boiling point compounds as a falling film on the inner walls of said tubes. Basically, each tube is a vapor-liquid contacting device, the flow of vapors up the center of the tube being countercurrent to the downward flow of the reflux thereby making it possible to obtain a number of equilibrium stages throughout the length of the tube. By using smaller diameter tubes, the diffusion of gas from the center to the falling liquid film requires less time and therefore with the use of a large number of small diameter tubes a large number of stages of separation can be obtained in a short column. The multitube column of this invention attains height equivalent of theoretical plate values as low as 1 to 1.5 inches. The falling film of condensate is then collected from the lower ends of the tubes and is transferred to contact with the exterior walls of said tubes where, the pressure exterior to said tubes being less the pressure within the tubes, it is affected by the heat of reflux within the tubes causing the liquid condensate to vaporize. The vapors of the liquid condensate are then pumped through a vapor pump. By such vapor pumping means, vapors from the recycled reflux condensate in contact with the tube exteriors thus have their pressure increased and said vapors with increased pressure become reboiled vapors for introduction into the lower openings of the tubes. This novel process of the present invention for separating a lower boiling point compound as a vapor from a mixture of compounds having different boiling points employs a minimum number of heat exchanges and direct reuse for reboiling of heat lost is used coolant.

By this process various mixtures of compounds may be readily and economically purified by separating out the lower boiling point compound or compounds contained in the mixture. It is possible, as will be seen in Example 5, to economically purify crude hexafluoroethane (B.P. −78.1° C.) containing 0.13% chlorotrifluoromethane (B.P. −81.4° C.) to hexafluoroethane containing not over 0.079% chlorotrifluoromethane. Likewise it is possible to readily purify a mixture of trifluorotrichloroethane isomers ($CFCl_2CF_2Cl$ B.P. 47.57° C. and $CF_3CCl_3$ B.P. 45.7° C.) by separating out as a vapor the lower boiling point $CFCCl_3$ isomer as seen in Examples 1, 2 and 3.

An embodiment of the apparatus of the present invention can best be described by reference to FIG. 1. The multitube still column has an external cylindrical shell 1 having its longitudinal axis vertically oriented with an upper closure at the top and a lower closure at the bottom. It surrounds a bundle of generally parallel open end essentially equal diameter tubes 2 which are mounted within shell 1 having their axis generally parallel to the longitudinal axis of the shell. The tubes 2 are fixed in place by an upper seal 3 and a lower seal 4, each being horizontally situated across the interior of the shell and encircling each tube 2 but neither seal closing the open ends of the tubes. The space inside the shell around the tubes and between the seals comprises the shell space 10. The external shell 1 extends above the upper seal 3 and is closed at its upper end to provide a top head space 5. A vapor exit 6 is provided in the top head space 5 for the withdrawal of vapors. The external shell 1 extends below the lower seal 5 and is closed at its lower end a sufficient distance below the lower ends of the tubes 2 to provide a liquid holder zone 7 in the lower portion of the bottom head space formed and a vapor recirculating zone 8 in the space between the lower ends of distilling tubes and the liquid holder zone.

A vapor pump 9 is connected at its inlet to a vapor outlet 11 in the shell space 10 and at its outlet to the vapor inlet 12 of the vapor recirculating zone 8. A liquid pressure let-down valve 13 is connected at its inlet to a liquid outlet 14 from the liquid holder section 7 and at its exit to an inlet 15 to the shell space. The valve 13 is not useful in all cases and may require substitution by a liquid pump in cases where there is less pressure at the outlet 14 than is needed to move the liquid phase into the liquid inlet 15.

Valve controlled inlet 16 and valve controlled outlet 17 are for introducing new material for distillation at inlet 16 and withdrawing purified liquid material from the outlet 17. They may be used continuously in a continuous distillation or intermittently in a batch distillation. In the case of a batch distillation the valve controlled outlet 17 may instead be positioned at any point on the liquid holder zone 7 or along the passage between the liquid outlet 14 and the liquid inlet 15.

Optionally across the top of the open ends of the tubes 2 there is positioned a porous flow restricting layer 18 of porous sheet material held down by a porous metal cover 19. This combination of flow restricting layer and metal cover has known equivalents to control the flow of vapors between the upper ends of the tubes 2 and the head space 5. For low efficiency separation the flow controlling layer and the cover give little added benefit.

The tubes 2 have provision for allowing reflux condensate to flow downward while vapors may rise in the tubes with minimal interference. The tubes may be cut diagonally at the bottom with respect to the tube axis as in FIG. 1 to minimize interference between the vapors which enter and the reflux condensate which exits. Another effective means to accomplish this end is to attach to the interior of each tube smaller open end tubes to conduct vapors upward and reflux condensate downward as in FIG. 2, with minimal interference. In FIG. 2, an open drip tube 20 is mounted inside and against the lower end of tube 2 and extends below the tube. An open vapor tube 21 is also mounted inside the lower end of the tube 2 and it extends above the upper end of the drip tube but not as low as the lower end of the drip tube.

The apparatus operates in the following fashion. Depending on the volatility of the lower boiling compound of the mixture to be separated as well as on the intended absolute operating pressure, heating or cooling may be applied to the apparatus. A charge of a mixture of compounds having vapor pressures which are different but of the same order of magnitude is introduced as a liquid into the liquid holder zone via valve controlled inlet 16. Operating pressure of the apparatus is established by drawing suitable vacuum at the vapor outlet 6 or by limiting the pressure at the vapor outlet 6 while adjusting heating or cooling of the apparatus. The vapor pump 9 and the valve 13 or a pump in its stead are brought up to operating conditions so that reflux condensate or the charge in the liquid holder zone 7 is steadily moved out of the liquid outlet 14 and into the liquid inlet 15 while vapors from evaporating reflux condensate or charge are pumped from the vapor outlet 11 to the vapor inlet 12.

The increase in the pressure of the vapors by the compressor 9 causes the vapors entering by inlet 12 into the vapor recirculatnig zone 8 to have a higher pressure than the shell space from which they were withdrawn by outlet 11. Thus the pump makes the vapors it supplies to the interiors of the tubes 2 susceptible to condensation by the liquid in the shell space because the liquid in the shell space is cooler than the vapors in the tubes 2.

The vapors supplied rise in the tubes 2 and condense on the walls as a falling film while some uncondensed vapors richer in lower boiling component pass into the head space 5 for withdrawal through the vapor exit 6. The falling film of condensate then drops into the liquid holder zone leaner in the lower boiling compound. This liquid then passes into another cycle of treatment starting with its movement to the liquid inlet 15 of the shell space.

The concentration of overhead vapors in the tubes is brought to the desired value by running the apparatus at total reflux. Normally less than an hour of total reflux time is required.

The operation of the multitube column may be improved by incorporating a flow restrictor as mentioned previously at the top of all the tubes. A disc restricting the flow of vapors at the top of every tube will obtain the same reflux ratio in each tube, a smoother reflux and a higher separation efficiency. The disc used in the examples was made from a preferred microporous vapor permeable sheet of a polyurethane material and was held down with porous metal heated where necessary to assure non-clogging of the pores with condensed vapor, but any flow limiting device may be used as its equivalent.

The materials from which the tubes in the multitube column are made must be wettable by the refluxing condensate, but may otherwise be of any material which is resistant to the mixture of the compounds being distilled. In the examples the tubes are made of preferred perfluorinated ethylene-propylene polymer. This resin has a poor heat transfer property and it is suspected that such a property contributes to the ability of recirculated reflux condensate vapors to penetrate deeply upwards into the distilling tubes before they are condensed.

All of the tubes used in the column should have essentially the same internal diameter and wall thickness in order to assure similar performance. While the internal tube diameter is not critical, a preferred internal diameter is 2.03 mm.

While said tubes are generally parallel, strict parallelism is not required. The rigidity needed to maintain strict parallelism is not present in small diameter tubes normally used for multitube columns in this invention.

The following examples are intended to be merely illustrative of the invention and not in limitation thereof.

EXAMPLE 1

A multitube still column as illustrated in FIG. 1 having for its tubes 2 a bundle of 276 hollow tubes each 61 cm. long, having an internal diameter of 2.03 mm. and made of tetrafluoroethylene/hexafluoropropylene copolymer resin and employing a positive displacement vapor pump and a low flow capacity liquid pump was set up for operation. Each tube 2 was fitted with two small tubes as exemplified by FIG. 2, one a 0.76 mm. I.D. vapor tube 76 mm. long extending 13 mm. below the tube 2 and one a 0.46 mm. I.D. drip tube 102 mm. long having the upper end 25–50 mm. below the upper end of the vapor tube.

1500 ml. of a mixture of trifluorotrichloroethane isomers ($CFCl_2CF_2Cl$ having a boiling point of 47.57° C. and $CF_3CCl_3$ having a boiling point of 45.7° C.) was added via a valve controlled inlet as illustrated by number 16 of FIG. 1. The apparatus was brought to an equilibrium operating condition in less than an hour by totally refluxing the isomers while a vacuum of 407 mm. of mercury was maintained inside the tubes 2, and then vapor withdrawal was begun. The vapor pump load was 300 watts. While a liquid reflux rate of 40 ml./min. was maintained and vapors were withdrawn from the top of the column at a rate of 0.2 ml./min. of their condensate a vacuum of 457 mm. of mercury existed outside the tubes. At the end of 2 hours the vapors being withdrawn via outlet 6 contained 2.5% $CF_3CCl_3$ while the vapor feed at the bottom of the tubes, representative of purified material, contained only 1.5% of $CF_3CCl_3$.

Another charge of the same material in the same equipment under the same conditions showed 2.3% $CF_3CCl_3$ content in the vapors withdrawn and 1.5% $CF_3CCl_3$ content at the bottom of the tubes.

Infrared spectral analysis was used to determine $CF_3CCl_3$ content in Examples 1–4.

EXAMPLE 2

An apparatus similar to that of Example 1 was set up but a microporous vapor permeable sheet of a polyurethane material was laid over the ends of all the tubes and held down by a porous metal plate screwed to the tube seal. 1500 ml. of a mixture of trifluorotrichloroethane isomers was added. This system was brought to equilibrium at total reflux while holding a vacuum of 407 mm. Hg inside the tubes and then vapor withdrawal was begun. The vapor pump load was 300 watts. While the liquid reflux rate was 40 ml./min. and the overhead vapors were drawn out at 0.8 mL./min. of their condensate a vacuum of 457 mm. Hg existed outside the tubes. At the end of one hour of such operation the overhead vapors and the vapor feed contained 3.2% and 1.7% $CF_3CCl_3$, respectively.

EXAMPLE 3

A column of the kind described in Example 1 using a bundle of 279 hollow tubes of tetrafluoroethylene/hexafluoropropylene copolymer resin each of which was 366 cm. long and had an inside diameter of 2.03 mm. was set up. Seals in this column were positioned so that the tubes had only their top 61 cm. of length surrounded by cooling liquid. The bottom end of each tube was diagonally cut to enable liquid reflux with minimal interference by vapors. A vapor pump and a liquid pump were connected in the manner described in Example 1.

1500 ml. of a mixture of trifluorotrichloroethane isomers was distilled after establishing equilibrium total reflux conditions at a vacuum of 330 mm. Hg inside the tubes. At a liquid reflux rate of 80 ml./min. and an overhead vapor withdrawal of 0.13 ml./min. of its condensate the vacuum outside the tubes was 407 mm. Hg. Vapor pump load was 270 watts. At the end of 17 hours the overhead vapor from the tubes was 2.5% $CF_3CCl_3$ while the feed vapor contained 0.8% $CF_3CCl_3$.

EXAMPLE 4

The apparatus utilized in Example 4 was similar to the apparatus of Example 3 except that a microporous vapor permeable sheet of a polyurethane material was laid over the ends of all the tubes and weighted down by 10 cm. of lead shot.

1500 ml. of trifluorotrichloroethane isomer mixture was distilled at a vacuum of 305 mm. Hg inside the tubes. While a liquid reflux rate of 90 ml./min. and an overhead flow of 0.4 ml./min. as condensate was maintained, a vacuum of 356 mm. Hg existed around the tubes. The vapor pump load was 250 watts. At the end of 3.5 hours the overhead vapor withdrawal was 4.8% $CF_3CCl_3$ and the vapor feed was 0.8% $CF_3CCl_3$.

EXAMPLE 5

A column of the kind described in FIG. 1 using a bundle of 680 hollow tubes of perfluoroethylene/perfluoropropylene copolymer resin each of which was 366 cm. long and has an inside diameter of 2.03 mm. was set up. The seals were positioned in the column to have the entire length of the tubes surrounded by cooling liquid. Each tube 2 was fitted with a 0.76 mm. I.D. vapor tube 76 mm. long extending 13 mm. below the tube 2 and a 0.56 mm. I.D. tube 64 mm. long having the upper end 25–35 mm. below the upper end of the vapor tube. All tubes were topped by a cover as in Example 4. The column was fitted with a positive displacement vapor pump. Movement of reflux condensate to the shell space was allowed by a letdown valve having flow controlled by liquid level in the reflux condensate collector.

19.5 kg. of hexafluoroethane containing 0.13 molar percent of chlorotrifluoromethane as the significant impurity was treated in this apparatus using an operating pressure of 19.9 kg./cm.$^2$ gage inside the tubes 2. While the reflux rate was 91 kg./hr. and 104 g./hr. of vapors were withdrawn the pressure outside the distilling tubes was 19.2 kg./cm.$^2$ gage. The pump load was 1700 watts.

2½ hours later the concentrations in the overhead vapor and in the liquid reflux were 8.8 mole percent and 0.083 mole percent, respectively.

After another 1½ hours the concentrations of chlorotrifluoromethane in the overhead vapor and in the liquid reflux were 7.9 mole percent and 0.079 mole percent, respectively. 19.1 kg. of material remained in the system at the end of this time.

Gas chromatography was used to determine the chlorotrifluoromethane mole percentage in Examples 5 and 6.

EXAMPLE 6

Equipment similar to that utilized in Example 5 was used to treat 20.4 kg. of hexafluoroethane containing about 0.59 kg. chlorotrifluoromethane added as test impurity. With an operating pressure of 19.8 kg./cm.$^2$ gage maintained inside the tubes at a reflux rate of 91 kg./hr. a pressure of 18.7 kg./cm.$^2$ gage existed outside the tubes. Pump load to maintain the reflux was 1700 watts. Overhead vapor removal was initiated. The progress of the separation is shown by the following table timed from the moment overhead vapor removal began:

| Time, min. | Overhead vapor takeoff rate, kg./hr. | Overhead vapor mole percent content of CClF$_3$ | Liquid reflux mole percent content of CClF$_3$ |
|---|---|---|---|
| 0 | 0.5 | 26.8 | 3.8 |
| 50 | 0.5 | 24.0 | 3.5 |
| 125 | 0.5 | 22.8 | 2.8 |
| 175 | 0.5 | 23.4 | 2.8 |
| 245 | 0.5 | 21.8 | 1.40 |
| 290 | 0.2 | 20.8 | 0.96 |
| 350 | 0.2 | 19.4 | 0.73 |

It may be seen from this example that this system of separation is easily adaptable to a continuous purification method in which a continuous input of a mixture of compounds to be separated is introduced into the system while purified reflux condensate is continuously withdrawn from the system if the rates of input and withdrawal are properly related to the liquid reflux rate and the overhead vapor takeoff rate.

The embodiments of the invention in which an exclusive property or privilege is claimed are defined as follows:

1. A process for separating a lower boiling point fraction as a vapor from a mixture of compounds having different boiling points which comprises simultaneously passing vapors of the mixture of compounds into the lower ends of the interiors of a bundle of vertically oriented generally parallel open end essentially equal diameter tubes, said tubes being wettable by condensate of the vapors, withdrawing vapors of the lower boiling point compound which pass out of the upper ends of said tubes, condensing vapors of the higher boiling point compounds as a falling film on the inner walls of said tubes, collecting said condensate from the lower ends of said tubes and transferring it to contact with the exterior walls of said tubes where, the pressure exterior to said tubes being less than the pressure within said tubes, said condensate is partially or completely vaporized by the heat of reflux within the tubes, and pumping the vapors of said liquid condensate thus formed through a vapor pump and into the lower ends of the interiors of the tubes for further fractionation.

2. A process according to claim 1 wherein a lower boiling point trifluorotrichloroethane isomer, $CF_3$-$CCl_3$, as a vapor is separated from a mixture of trifluorotrichloroethane isomers, $CF_3CCl_2$ and $CFCl_2CF_2Cl$, having different boiling points.

3. A process according to claim 1 wherein lower boiling point chlorofluoromethane as a vapor separated from a mixture of chlorotrifluoromethane and hexafluoroethane having different boiling points.

4. An apparatus for separating a lower boiling point fraction as a vapor from a mixture of compounds having different boiling points which comprise a cylindrical shell having its longitudinal axis vertically oriented with an upper closure at the top and a lower closure at the bottom; a bundle of generally parallel open end essentially equal diameter tubes mounted within the shell having their axes generally parallel to the longitudinal axis of the shell and having their lower ends so constructed as to facilitate the countercurrent flow of vapors and liquid reflux; a seal at the upper end of the tubes being horizontally situated across the interior of the shell and encircling each tube forming a top head space below the upper closure of the shell which communicates with the interior of the tubes, and serving as an upper end wall of a shell space; a vapor outlet in the top head space; a seal at the lower end of the tubes being horizontally situated across the interior of the shell and encircling each tube forming a bottom head space the lower portion of which is a liquid holder space and the upper portion of which communicates with the interior of the tubes, and serving as a lower end wall of a shell space; an inlet in the bottom head space; a vapor pumping means for transporting vapors from the upper end of the shell space to the upper portion of the bottom head space forming a vapor circulating system; a liquid recirculating means for transporting liquid from the lower portion of the bottom head space to the lower end of the shell space; and an outlet communicating with the shell space for removing liquid.

5. An apparatus according to claim 4 wherein there is positioned across the open upper ends of the tubes a porous flow restricting sheet material layer held down by a porous metal cover.

6. An apparatus according to claim 5 wherein a polyurethane material is utilized as the porous flow restricting sheet material layer which is positioned across the upper ends of the tubes.

7. An apparatus according to claim 4 wherein tetrafluoroethylene/hexafluoropropylene copolymer resin is utilized as the tube material.

8. An apparatus according to claim 4 wherein the inside tube diameter is 2.03 mm.

9. An apparatus according to claim 4 wherein the lower end of each tube is cut diagonally with respect to the tube axis.

10. An apparatus according to claim 4 wherein there is attached to the inside of the lower end of each tube an open drip tube which extends below the tube and an open vapor tube which extends above the upper end of the drip tube but not below the lower end of the drip tube.

References Cited
UNITED STATES PATENTS

| | | | |
|---|---|---|---|
| 2,609,334 | 9/1952 | Pyle et al. | 202—237 |
| 2,949,745 | 8/1960 | Etienne. | |
| 3,099,607 | 7/1963 | Lustenader | 159—24 |
| 3,390,534 | 7/1968 | Bergo et al. | 62—26 |
| 3,303,105 | 2/1967 | Konikoff et al. | 202—200 |
| 3,374,637 | 3/1968 | Wenzke | 62—26 |

WILBUR L. BASCOMB, JR., Primary Examiner

U.S. Cl. X.R.

62—30; 159—24; 202—197, 198, 200, 205, 237; 203—86, 87, 94; 260—653